United States Patent
Jiang et al.

(10) Patent No.: US 12,133,226 B2
(45) Date of Patent: Oct. 29, 2024

(54) METHOD AND DEVICE IN NODES USED FOR WIRELESS COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 463 days.

(21) Appl. No.: 17/588,291

(22) Filed: Jan. 30, 2022

(65) Prior Publication Data
US 2022/0159647 A1 May 19, 2022

Related U.S. Application Data

(63) Continuation of application No. PCT/CN2020/104729, filed on Jul. 27, 2020.

(30) Foreign Application Priority Data

Aug. 7, 2019 (CN) .......................... 201910724481.3

(51) Int. Cl.
*H04W 72/21* (2023.01)
*H04L 1/00* (2006.01)
(Continued)

(52) U.S. Cl.
CPC ........... *H04W 72/21* (2023.01); *H04L 1/0003* (2013.01); *H04W 28/26* (2013.01); *H04W 72/0446* (2013.01)

(58) Field of Classification Search
CPC . H04W 72/21; H04W 28/26; H04W 72/0446; H04W 72/20; H04L 1/0003; H04L 5/0005; H04L 5/0091; H04L 5/0053
See application file for complete search history.

(56) References Cited

U.S. PATENT DOCUMENTS

2010/0272048 A1* 10/2010 Pan ....................... H04L 1/1635
    370/329
2016/0044655 A1* 2/2016 Park ..................... H04W 72/21
    370/329
(Continued)

FOREIGN PATENT DOCUMENTS

| CN | 107734688 A | 2/2018 |
|----|-------------|--------|
| CN | 109150424 A | 1/2019 |

(Continued)

OTHER PUBLICATIONS

Song et al., CN 111181706 A, "Method and terminal for sending hybrid automatic repeat request acknowledgement (English)", May 19, 2020, ip.com, 25 Pages. (Year: 2020).*

(Continued)

*Primary Examiner* — Brian J. Gillis
*Assistant Examiner* — Chhian (Amy) Ling

(57) ABSTRACT

The present disclosure provides a method and device in a node used for wireless communications. A first node first receives a first signal and a second signal; determines that there exists an overlapping between a first radio resource block and a second radio resource block in time domain; then transmits a first bit block and a second bit block in a third radio resource set; the first bit block and the second bit block are respectively used to indicate whether the first signal and the second signal are correctly received; the first radio resource block and the second radio resource block are respectively reserved for transmitting the first bit block and the second bit block. The application determines different transmission methods of uplink control information according to a value of K1, which reduces the impact caused by the conflict and improves the uplink transmission performance.

13 Claims, 5 Drawing Sheets

(51) Int. Cl.
    *H04W 28/26*     (2009.01)
    *H04W 72/0446*     (2023.01)

(56) References Cited

U.S. PATENT DOCUMENTS

2021/0014883 A1*   1/2021   Khoshnevisan ...... H04W 72/23
2021/0336724 A1*  10/2021   Song ..................... H04L 1/1614

FOREIGN PATENT DOCUMENTS

| CN | 111181706 A | * | 5/2020 | ........... H04L 1/1614 |
| WO | 2014157927 A1 | | 10/2014 | |
| WO | 2019038832 A1 | | 2/2019 | |

OTHER PUBLICATIONS

Qualcomm Incorporated;. "Summary ofremaining issues for overlapping UL transmissions. RI-1807820;" 3GPP TSG RAN WGI Meeting #93;, May 25, 2018 (May 25, 2018).
ISR received in application No. PCT/CN2020/104729 dated Oct. 30, 2020.

* cited by examiner

Second radio resource block

Third radio resource block

Puncturing part

Second radio resource block

Third radio resource block

METHOD AND DEVICE IN NODES USED FOR WIRELESS COMMUNICATION

CROSS REFERENCE TO RELATED APPLICATIONS

This application is the continuation of International Patent Application No. PCT/CN2020/104729, filed on Jul. 27, 2020, which claims the priority benefit of Chinese Patent Application No. 201910724481.3, filed on Aug. 7, 2019, the full disclosure of which is incorporated herein by reference.

BACKGROUND

Technical Field

The present disclosure relates to transmission methods and devices in wireless communication systems, and in particular to a method and device for transmitting uplink control information of a radio signal in a wireless communication system.

Related Art

In 5G system, in order to support more demanding Ultra Reliable and Low Latency Communication (URLLC) services, for example, with higher reliability (e.g., a target BLER is 10^-6) and with lower delay (e.g., 0.5-1 ms), a study item (SI) of URLLC advancement in New Radio (NR) Release 16 was approved at 3rd Generation Partner Project (3GPP) Radio Access Network (RAN) #80 Plenary. One focus of the study is how to realize lower transmission delay and higher transmission reliability of a Physical Uplink Shared CHannel (PUSCH)/Physical Downlink Shared CHannel (PDSCH).

In order to further reduce the transmission delay and improve flexibility of the transmission, some companies proposed that Physical Uplink Control Channel (PUCCH) resources of the URLLC can be transmitted across a boundary of a sub-slot, that is, resources used for transmitting the PUCCH do not need to be aligned with the sub-slot in time domain. For the above scenario, the multiplexing of the PUCCH needs to be redesigned.

SUMMARY

In NR Release-15 system, a UE will only transmit Uplink Control Information (UCI) comprising a Hybrid Automatic Repeat reQuest Acknowledgement (HARQ-ACK) in a slot, and when a slot needs to feed back HARQ-ACKs of a plurality of PDSCHs, the UE will multiplex the corresponding plurality of HARQ-ACKs into a PUCCH or PUSCH. In the URLLC, time-domain resources occupied by a PUCCH will be narrower than time-domain resources occupied by a PUCCH of NR. If the PUCCH can also cross a boundary of a sub-slot, the transmission of the PUCCH of the URLLC will be more flexible, and the collision degrees of PUCCHs of URLLCs corresponding to different PDSCHs will also be different. Further, when UCIs corresponding to different PDSCH collide, other methods other than multiplexing can be adopted to improve the flexibility and performance of the PUCCH transmission.

The present disclosure provides a solution to optimize the above situation. It should be noted that embodiments of the first node in the present disclosure and characteristics of the embodiments can be applied to the base station if no conflict is incurred, and the embodiments of the second node in the present disclosure and characteristics of the embodiments can be applied to the terminal. The embodiments in the present disclosure and the characteristics in the embodiments can be arbitrarily combined if there is no conflict.

The present disclosure provides a method in a first node for wireless communications, comprising:

receiving a first signal and a second signal;

determining that there exists an overlapping part in time domain between time-domain resources occupied by a first radio resource block and time-domain resources occupied by a second radio resource block; and transmitting a first bit block and a second bit block in a third radio resource set;

herein, the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

In one embodiment, advantages of the above method include: The above method establishes a connection between a transmission method of the first bit block and the second bit block and a number of multicarrier symbols comprised in the overlapping part; when the number of multicarrier symbols in the overlapping part is large, multiplexing is adopted to improve spectrum efficiency; and when the number of multicarrier symbols in the overlapping part is small, independent transmission methods are adopted to reduce delay of UCIs with earlier positions in time domain.

In one embodiment, advantages of the above method include: The multiplexing method adopted in NR means that two UCIs are multiplexed into one PUCCH or PUSCH for transmission, and then the two UCIs are fed back to a base station at the same time. Such a solution will cause the UCI fed back first in the URLLC to wait for the UCI fed back later to be transmitted together, which will introduce extra delay; and meanwhile, configuration of the PUCCH resources needs to always take the multiplexing possibility into account, which leads to potential waste of the PUCCH resources; and the scheme proposed in this application effectively alleviates the above problems.

According to one aspect of the present disclosure, the above method is characterized in that when K1 is greater than a first integer, the third radio resource set is the second radio resource block, and the first bit block and the second bit block are used together to generate a target signaling; the target signaling is transmitted in the third radio resource set.

In one embodiment, advantages of the above method include: A number of overlapping multicarrier symbols is greater than a first integer, which means that an overlapping degree of a first radio resource block and a second radio resource block reserved for two UCIs is relatively high, so that the multiplexing method will not lead to much extra delay, thus saving resources for transmitting a PUCCH.

According to one aspect of the present disclosure, the above method is characterized in that when K1 is not greater than a first integer, the third radio resource set comprises the first radio resource block and a third radio resource block, time-domain resources occupied by the third radio resource block is a part of time-domain resources occupied by the second radio resource block being orthogonal to time-domain resources occupied by first radio resource block; the first bit block is transmitted in the first radio resource block, and the second bit block is transmitted in the third radio resource block.

In one embodiment, advantages of the above method include: A number of overlapping multicarrier symbols is not greater than a first integer, which means that a first radio resource block and a second radio resource block reserved for two UCIs have only a small amount of overlapping multicarrier symbols, so that the method of puncturing/rate matching is adopted to transmit the two UCIs orthogonally to avoid introducing extra delay.

According to one aspect of the present disclosure, the above method is characterized in that a start multicarrier symbol occupied by the first radio resource block is a first multicarrier symbol, and an end multicarrier symbol occupied by the first radio resource block is a second multicarrier symbol; a start multicarrier symbol occupied by the second radio resource block is a third multicarrier symbol, and an end multicarrier symbol occupied by the second radio resource block is a fourth multicarrier symbol; the first multicarrier symbol and the third multicarrier symbol belong to a first sub-slot, and the second multicarrier symbol and the fourth multicarrier symbol belong to a second sub-slot.

In one embodiment, advantages of the above method include: Reserved radio resources corresponding to the UCI that can be multiplexed are limited to a sub-slot to avoid the problem of the large delay incurred by the multiplexing transmission method crossing a plurality of sub-slots.

According to one aspect of the present disclosure, the above method is characterized in comprising:
receiving a first signaling and a second signaling;
herein, the first signaling comprises configuration information of the first signal, and the second signaling comprises configuration information of the second signal.

According to one aspect of the present disclosure, the above method is characterized in that time-domain resources occupied by the first radio resource block are not aligned with a boundary of a sub-slot, or time-domain resources occupied by the second radio resource block are not aligned with a boundary of a sub-slot.

In one embodiment, advantages of the above method include: The application scope of the method in the present disclosure is limited to a PUCCH across sub-slot boundary, which not only reflects the benefits of the above scheme, but also avoids the complexity caused by adopting the above scheme in the scenario of non-across sub-slot boundary.

The present disclosure provides a method in a second node for wireless communications, comprising:
transmitting a first signal and a second signal;
determining that there exists an overlapping part in time domain between time-domain resources occupied by a first radio resource block and time-domain resources occupied by a second radio resource block; and
receiving a first bit block and a second bit block in a third radio resource set;
herein, the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

According to one aspect of the present disclosure, the above method is characterized in that when K1 is greater than a first integer, the third radio resource set is the second radio resource block, and the first bit block and the second bit block are used together to generate a target signaling; the target signaling is transmitted in the third radio resource set.

According to one aspect of the present disclosure, the above method is characterized in that when K1 is not greater than a first integer, the third radio resource set comprises the first radio resource block and a third radio resource block, time-domain resources occupied by the third radio resource block is a part of time-domain resources occupied by the second radio resource block being orthogonal to time-domain resources occupied by first radio resource block; the first bit block is transmitted in the first radio resource block, and the second bit block is transmitted in the third radio resource block.

According to one aspect of the present disclosure, the above method is characterized in that a start multicarrier symbol occupied by the first radio resource block is a first multicarrier symbol, and an end multicarrier symbol occupied by the first radio resource block is a second multicarrier symbol; a start multicarrier symbol occupied by the second radio resource block is a third multicarrier symbol, and an end multicarrier symbol occupied by the second radio resource block is a fourth multicarrier symbol; the first multicarrier symbol and the third multicarrier symbol belong to a first sub-slot, and the second multicarrier symbol and the fourth multicarrier symbol belong to a second sub-slot.

According to one aspect of the present disclosure, the above method is characterized in comprising:
transmitting a first signaling and a second signaling; the first signaling comprises configuration information of the first signal, and the second signaling comprises configuration information of the second signal.

According to one aspect of the present disclosure, the above method is characterized in that time-domain resources occupied by the first radio resource block are not aligned with a boundary of a sub-slot, or time-domain resources occupied by the second radio resource block are not aligned with a boundary of a sub-slot.

The present disclosure provides a first node for wireless communications, comprising:
a first receiver, receiving a first signal and a second signal;
a first processor, determining that there exists an overlapping part in time domain between time-domain resources occupied by a first radio resource block and time-domain resources occupied by a second radio resource block; and
a first transmitter, transmitting a first bit block and a second bit block in a third radio resource set;
herein, the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

The present disclosure provides a second node for wireless communications, comprising:
a second transmitter, transmitting a first signal and a second signal;
a second processor, determining that there exists an overlapping part in time domain between time-domain resources occupied by a first radio resource block and time-domain resources occupied by a second radio resource block; and
a second receiver, receiving a first bit block and a second bit block in a third radio resource set;
herein, the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

In one embodiment, the present disclosure has the following advantages over conventional schemes:

The present disclosure establishes a connection between a transmission method of the first bit block and the second bit block and a number of multicarrier symbols comprised in the overlapping part; when a number of multicarrier symbols in the overlapping part is large, multiplexing is adopted to improve spectrum efficiency; and when a number of multicarrier symbols in the overlapping part is small, independent transmission methods are adopted to reduce delay of UCIs with earlier positions in time domain;

The reserved radio resources corresponding to the UCI that can be multiplexed are limited to a sub-slot to avoid the problem of large delay caused by the multiplexing transmission method crossing a plurality of sub-slots;

The application scope of the method in the present disclosure is limited to the PUCCH across sub-slot boundary, which not only reflects the benefits of the above scheme, but also avoids the complexity caused by adopting the above scheme in the scenario of non-across sub-slot boundary.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
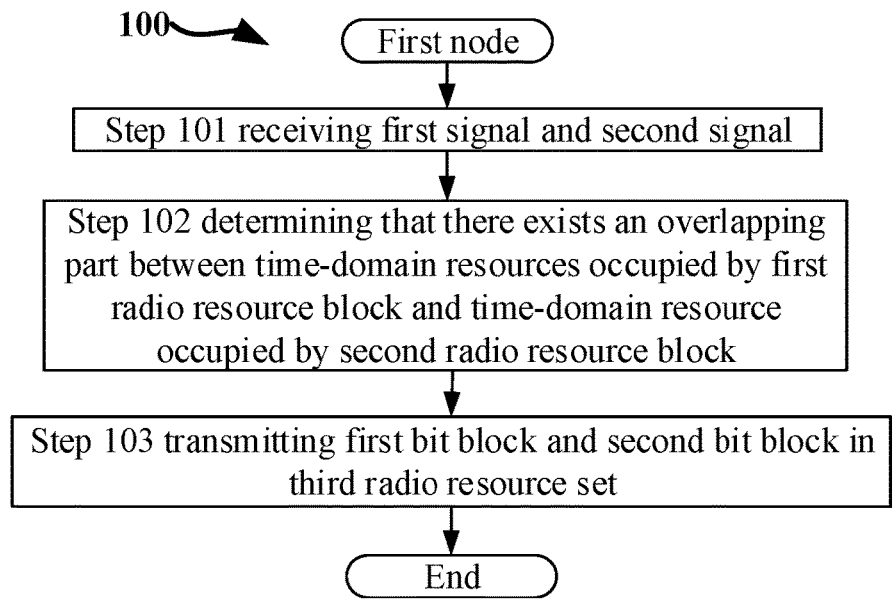
FIG. 1 illustrates a flowchart of the processing of a first node according to one embodiment of the present disclosure.

Embodiment 1 illustrates a flowchart of the processing of a first node, as shown in FIG. 1. In step 100 illustrated by FIG. 1, each box represents a step. In Embodiment 1, a first node in the present disclosure receives first signal and a second signal in step S101; determines that there exists an overlapping part in time domain between time-domain resources occupied by a first radio resource block and time-domain resources occupied by a second radio resource block in step S102; and transmits a first bit block and a second bit block in a third radio resource set in step S103.

In embodiment 1, the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

In one embodiment, a physical layer channel occupied by the first signal is a PDSCH.

In one embodiment, a physical layer channel occupied by the second signal is a PDSCH.

In one embodiment, a transmission channel occupied by the first signal is a Downlink Shared Channel (DL-SCH).

In one embodiment, a transport channel occupied by the second signal is a DL-SCH.

In one embodiment, the first signal is generated by a third bit block set, the third bit block set comprises at least one bit block, and the first bit block is used to indicate whether the third bit block set is correctly received.

In one embodiment, the second signal is generated by a fourth bit block set, the fourth bit block set comprises at least one bit block, and the second bit block is used to indicate whether the fourth bit block set is correctly received.

In one embodiment, the first signal is generated by a Transmission Block (1B).

In one embodiment, the second signal is generated by a TB.

In one embodiment, the first radio resource block occupies frequency-domain resources corresponding to at least one Resource Block (RB).

In one embodiment, the first radio resource block occupies time-frequency resources corresponding to at least one multicarrier symbol.

In one subembodiment of the embodiment, the at least one multicarrier symbol is(are) contiguous in time domain.

In one embodiment, the first radio resource block occupies a sub-slot in time domain.

In one embodiment, the first radio resource block occupies a slot in time domain.

In one embodiment, the first radio resource block occupies at least one Resource Element (RE) in frequency domain.

In one embodiment, the second radio resource block occupies frequency-domain resources corresponding to at least one RB in frequency domain.

In one embodiment, the second radio resource block occupies time-frequency resources corresponding to at least one multicarrier symbol.

In one subembodiment of the embodiment, the at least one multicarrier symbol is(are) contiguous in time domain.

In one embodiment, the second radio resource block occupies a sub-slot in time domain.

In one embodiment, the second radio resource block occupies a slot in time domain.

In one embodiment, the sub-slot in the present disclosure is a sub-slot.

In one embodiment, the sub-slot in the present disclosure is a mini-slot.

In one embodiment, the first signal is used for transmission of URLLC services.

In one embodiment, the second signal is used for transmission of URLLC services.

In one embodiment, the above phrase of there being an overlapping part between time-domain resources occupied by a first radio resource block and time-domain resources occupied by a second radio resource block in time domain includes: both the first radio resource block and the second radio resource block occupy K1 multicarrier symbol(s) in time domain.

In one embodiment, the above phrase of there being an overlapping part between time-domain resources occupied by a first radio resource block and time-domain resources occupied by a second radio resource block in time domain includes: time-domain resources occupied by the first radio resource block and time-domain resources occupied by the second radio resource block are not completely overlapped.

In one embodiment, the above phrase of there being an overlapping part between time-domain resources occupied by a first radio resource block and time-domain resources occupied by a second radio resource block in time domain includes: there at least exists a multicarrier symbol not belonging to time-domain resources occupied by the first radio resource block and time-domain resources occupied by the second radio resource block simultaneously.

In one embodiment, the multicarrier symbol in the present disclosure is an Orthogonal Frequency Division Multiplexing (OFDM) symbol.

In one embodiment, the multicarrier symbol in the present disclosure is a Single Carrier-Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is an PFDM symbol comprising a Cyclic Prefix (CP).

In one embodiment, the multi-carrier symbol in the present disclosure is a Discrete Fourier Transform Spreading Orthogonal Frequency Division Multiplexing (DFT-s-OFDM) symbol comprising a CP.

In one embodiment, the first bit block carries a HARQ-ACK for the first signal.

In one embodiment, the second bit block carries a HARQ-ACK for the second signal.

In one embodiment, the first bit block comprises M1 bit(s), M1 being a positive integer.

In one subembodiment of the above embodiment, M1 is equal to 1.

In one embodiment, the second bit block comprises M2 bit(s), M2 being a positive integer.

In one subembodiment of the above embodiment, M2 is equal to 2.

In one embodiment, the first bit block comprises Channel State Information (CSI).

In one embodiment, the second bit block comprises CSI.

In one embodiment, the first bit block comprises at least one of a Channel Quality Indicator (CQI), a Precoding Matrix Indicator (PMI) or a Rank Indicator (RI).

In one embodiment, the second bit block comprises at least one of a CQI, a PMI or an RI.

In one embodiment, the first signal is a radio signal.

In one embodiment, the first signal is a baseband signal.

In one embodiment, the second signal is a radio signal.

In one embodiment, the second signal is a baseband signal.

Embodiment 2

Figure 2:
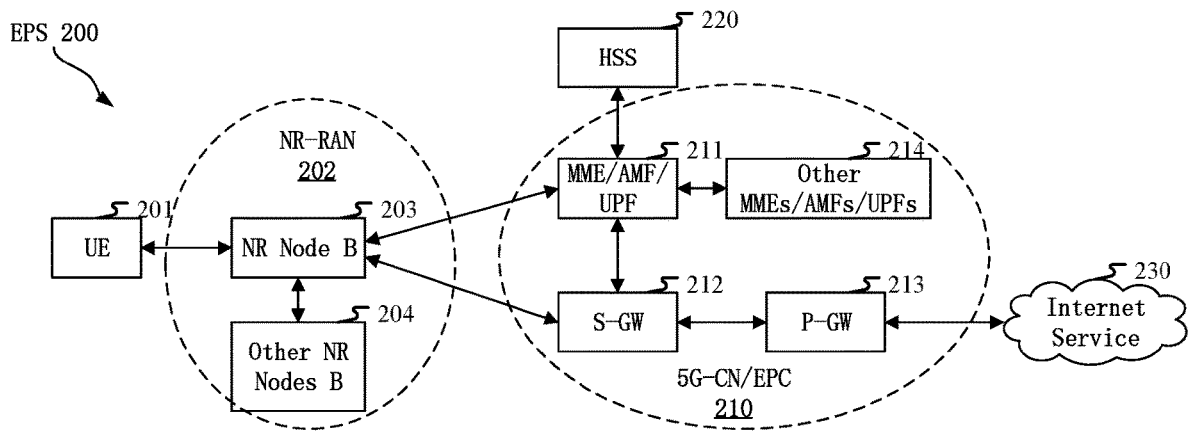
FIG. 2 illustrates a schematic diagram of a network architecture according to one embodiment of the present disclosure.

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LIE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the gNB 203 corresponds to the second node in the present disclosure.

In one embodiment, a radio interface between the UE 201 and the gNB 203 is a Uu interface.

In one embodiment, a radio link between the UE 201 and the gNB 203 is a cellular link.

In one embodiment, the first node in the present disclosure is the UE 201, and the second node in the present disclosure is the gNB 203 providing cellular network services for the first node.

In one embodiment, the first node supports URLLC services.

In one embodiment, the second node supports URLLC services.

In one embodiment, the first node supports simultaneous transmission of multiple services with different delay requirements.

In one embodiment, the second node supports simultaneous transmission of multiple services with different delay requirements.

In one embodiment, the first node supports a transmission of UCI based on a sub-slot.

In one embodiment, the second node supports a transmission of UCI based on a sub-slot.

In one embodiment, the first node supports a transmission of UCI across a boundary of sub-slot.

In one embodiment, the second node supports a transmission of UCI across a boundary of sub-slot.

Embodiment 3

Figure 3:
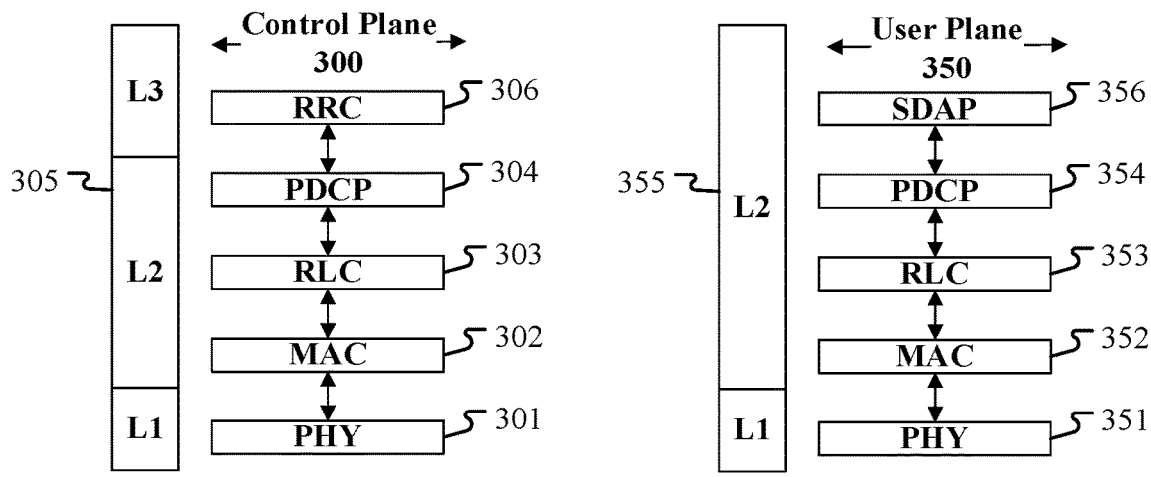
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or a RSU in V2X) and a second communication node (gNB, UE or a RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signal is generated by the PHY 301 or the PHY 351.

In one embodiment, the second signal is generated by the PHY 301 or the PHY 351.

In one embodiment, the first signal is generated by the MAC 352 or the MAC 302.

In one embodiment, the second signal is generated by the MAC 352 or the MAC 302.

In one embodiment, the first bit block is generated by the PHY 301 or the PHY 351.

In one embodiment, the second bit block is generated by the PHY 301 or the PHY 351.

In one embodiment, the first bit block is generated by the MAC 352 or the MAC 302.

In one embodiment, the second bit block is generated by the MAC 352 or the MAC 302.

In one embodiment, the first signaling is generated by the PHY 301 or the PHY 351.

In one embodiment, the second signaling is generated by the PHY 301 or the PHY 351.

In one embodiment, the first signaling is generated by the MAC 352 or the MAC 302.

In one embodiment, the second signaling is generated by the MAC 352 or the MAC 302.

In one embodiment, the first signaling is generated by the RRC 306.

In one embodiment, the second signaling is generated by the RRC 306.

Embodiment 4

Figure 4:
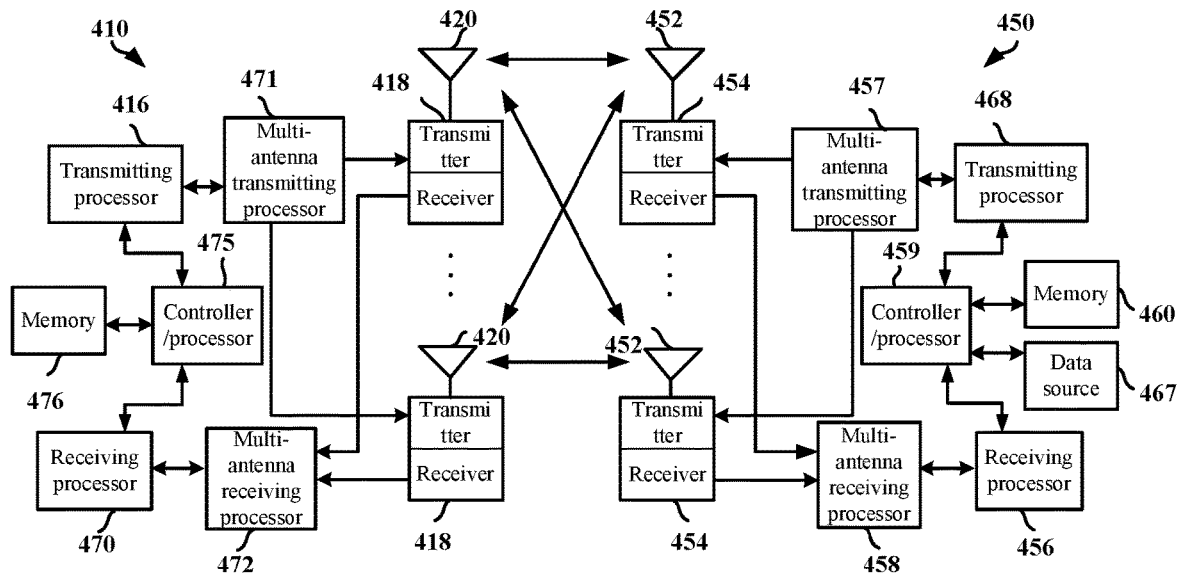
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least: receives a first signal and a second signal; determines that there exists an overlapping part in time domain between time-domain resources occupied by a first radio resource block and time-domain resources occupied by a second radio resource block; and transmits a first bit block and a second bit block in a third radio resource set; the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

In one embodiment, the first communication device 450 comprises at least one processor and at least one memory. a memory that stores a computer readable instruction program. The computer readable instruction program generates an action when executed by at least one processor. The action includes: receiving a first signal and a second signal; determining that there exists an overlapping part in time domain between time-domain resources occupied by a first radio resource block and time-domain resources occupied by a second radio resource block; and transmitting a first bit block and a second bit block in a third radio resource set; the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

In one embodiment, the second communication node 410 comprises at least one processor and at least one memory. The at least one memory comprises computer program codes; the at least one memory and the computer program codes are configured to be used in collaboration with the at least one processor. The second communication device 410 at least: transmits a first signal and a second signal; determines that there exists an overlapping part in time domain between time-domain resources occupied by a first radio resource block and time-domain resources occupied by a second radio resource block; and receives a first bit block and a second bit block in a third radio resource set; the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

In one embodiment, the second communication node 410 comprises a memory that stores a computer readable instruction program. The computer readable instruction program generates an action when executed by at least one processor. The action includes: transmitting a first signal and a second signal; determining that there exists an overlapping part in time domain between time-domain resources occupied by a first radio resource block and time-domain resources occupied by a second radio resource block; and receiving a first bit block and a second bit block in a third radio resource set;

the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the second communication device 410 is a base station.

In one embodiment, at least one of the antenna 452, the receiver 454, the multi-antenna receiving processor 458, the receiving processor 456 or the controller/processor 459 is used to receive a first signal and a second signal; at least one of the antenna 420, the transmitter 418, the multi-antenna transmitting processor 471, the transmitting processor 416 or the controller/processor 475 is used to transmit a first signal and a second signal.

In one embodiment, at least one of the antenna 452, the receiver/transmitter 454, the multi-antenna receiving processor 458, the multi-antenna transmitting processor 457, the receiving processor 456, the transmitting processor 468, or the controller/processor 459 is used to determine that there exists an overlapping part between time-domain resources occupied by a first radio resource block and time-domain resources occupied by a second radio resource block; at least one of the antenna 420, the receiver/transmitter 418, the multi-antenna transmitting processor 471, the transmitting processor 416, the multi-antenna receiving processor 472, the receiving processor 470 and the controller/processor 475 is used to determine that there exists an overlapping part between time-domain resources occupied by a first radio resource block and time-domain resources occupied by a second radio resource block.

In one embodiment, at least one of the antenna 452, the transmitter 454, the multi-antenna transmitting processor 457, the transmitting processor 468, and the controller/processor 459 is used to transmit a first bit block and a second bit block in a third radio resource set; at least one of the antenna 420, the receiver 418, the multi-antenna receiving processor 472, the receiving processor 470 or the controller/processor 475 is used to receive a first bit block and a second bit block in a third radio resource set.

In one embodiment, at least one of the antenna 452, the receiver 454, the multi-antenna receiving processor 458, the receiving processor 456 or the controller/processor 459 is used to receive a first signaling and a second signaling; at least one of the antenna 420, the transmitter 418, the multi-antenna transmitting processor 471, the transmitting processor 416 or the controller/processor 475 is used to transmit a first signaling and a second signaling.

Embodiment 5

Figure 5:
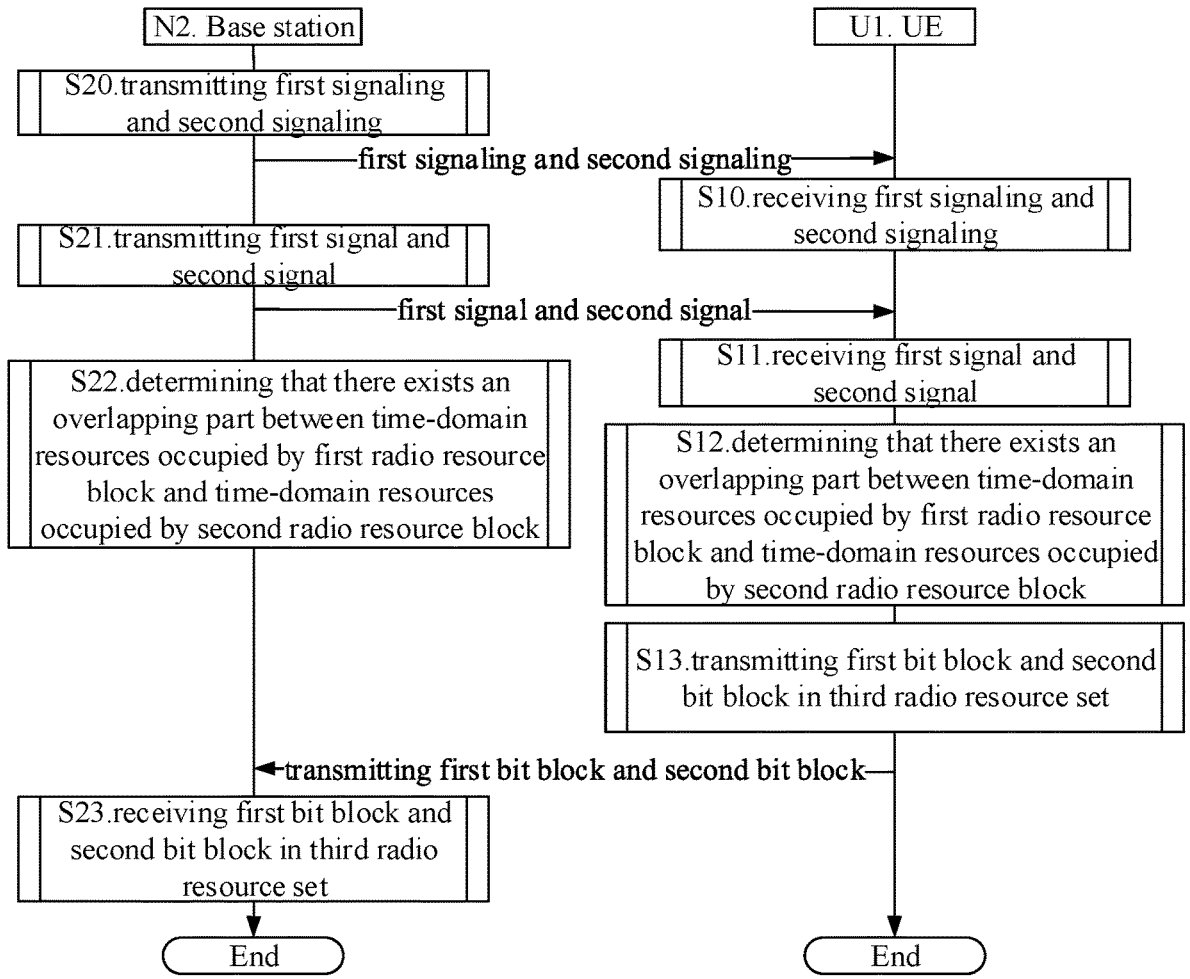
FIG. 5 illustrates a flowchart of a first signal and a second signal according to one embodiment of the present disclosure.

Embodiment 5 illustrates a flowchart of a first signal and a second signal, as shown in FIG. 5. In FIG. 5, a first node U1 and a second node N2 are in communications via an air interface.

The first node U1 receives a first signaling and a second signaling in step S10; receives a first signal and a second signal in step S11; determines that there exists an overlapping part in time domain between time-domain resources occupied by a first radio resource block and time-domain resources occupied by a second radio resource block in step S12; and transmits a first bit block and a second bit block in a third radio resource set in step S13.

The second node N2 transmits a first signaling and a second signaling in step S20; transmits a first signal and a second signal in step S21; determines that there exists an overlapping part in time domain between time-domain resources occupied by a first radio resource block and time-domain resources occupied by a second radio resource block in step S22; and receives a first bit block and a second bit block in a third radio resource set in step S23.

In embodiment 5, the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer; the first signaling comprises configuration information of the first signal, and the second signaling comprises configuration information of the second signal.

In one embodiment, when K1 is greater than a first integer, the third radio resource set is the second radio resource block, and the first bit block and the second bit block are used together to generate a target signaling; the target signaling is transmitted in the third radio resource set.

In one subembodiment of the embodiment, the first integer in the present disclosure is a positive integer.

In one subembodiment of the embodiment, the first integer in the present disclosure is fixed.

In one subembodiment of the embodiment, the first integer in the present disclosure is related to a type of a service corresponding to the first signal.

In one subembodiment of the embodiment, the first integer in the present disclosure is related to a type of a service corresponding to the second signal.

In one subembodiment of the embodiment, the first integer in the present disclosure is configured via a higher-layer signaling.

In one subembodiment of the embodiment, the first integer in the present disclosure is configured via an RRC signaling.

In one subembodiment of the above embodiment, the first integer in the present disclosure is cell-specific.

In one subembodiment of the above embodiment, the first integer in the present disclosure is UE-specific.

In one subembodiment of the embodiment, an end time of the first radio resource block in time domain is earlier than an end time of the second radio resource block in time domain.

In one subembodiment of the embodiment, the meaning of the above phrase of the first bit block and the second bit block being used together to generate a target signaling includes: information carried by the first bit block and information carried by the second bit block are used together to generate the target signaling.

In one subembodiment of the embodiment, the meaning of the above phrase of the first bit block and the second bit block being used together to generate a target signaling includes: information carried by the first bit block and information carried by the second bit block are multiplexed in the target signaling.

In one subembodiment of this embodiment, the target signaling is UCI.

In one subembodiment of this embodiment, a physical layer channel occupied by the target signaling comprises a PUCCH.

In one subembodiment of this embodiment, a physical layer channel occupied by the target signaling comprises a PUSCH.

In one embodiment, when K1 is not greater than a first integer, the third radio resource set comprises the first radio resource block and a third radio resource block, time-domain resources occupied by the third radio resource block is a part of time-domain resources occupied by the second radio resource block being orthogonal to time-domain resources occupied by first radio resource block; the first bit block is transmitted in the first radio resource block, and the second bit block is transmitted in the third radio resource block.

In one subembodiment of the embodiment, the meaning of the above phrase of time-domain resources comprised in the third radio resource block being an orthogonal part between time-domain resources occupied by the second radio resource block and time-domain resources occupied by the first radio resource block includes: The third radio resource block occupies Q3 multicarrier symbol(s) in time domain, the second radio resource block occupies Q2 multicarrier symbols in time domain, the first radio resource block occupies Q1 multicarrier symbols in time domain, the Q2 multicarrier symbols and Q4 multicarrier symbol(s) in the Q1 multicarrier symbols are overlapped, and the Q3 multicarrier symbol(s) is(are) Q3 multicarrier symbol(s) other than the Q4 multicarrier symbol(s) among the Q2 multicarrier symbols; Q3 is equal to a difference value of Q2 and Q4, Q4 is a positive integer less than a smaller value of Q1 and Q2, and Q1 and Q2 are both positive integers greater than 1.

In one subembodiment of the embodiment, the meaning of the above phrase of time-domain resources comprised in the third radio resource block being an orthogonal part between time-domain resources occupied by the second radio resource block and time-domain resources occupied by the first radio resource block includes: time-domain resources comprised in the third radio resource block and time-domain resources occupied by the first radio resource block are orthogonal.

In one subembodiment of the embodiment, the meaning of the above phrase of time-domain resources comprised in the third radio resource block being an orthogonal part between time-domain resources occupied by the second radio resource block and time-domain resources occupied by the first radio resource block includes: time-domain resources comprised in the third radio resource block belong to time-domain resources occupied by the second radio resource block.

In one subembodiment of the embodiment, the first bit block generates a third signal and the second bit block generates a fourth signal.

In one subsidiary embodiment of the subembodiment, an RE occupied by the third signal and an RE occupied by the fourth signal are non-overlapped.

In one subsidiary embodiment of the subembodiment, an RE occupied by the third signal and an RE occupied by the fourth signal are orthogonal.

In one subsidiary embodiment of the subembodiment, the third signal and the fourth signal are two independent UCIs.

In one subsidiary embodiment of the subembodiment, a physical layer channel occupied by the third signal and a physical layer channel occupied by the fourth signal are respectively two independent PUSCHs.

In one subsidiary embodiment of the subembodiment, a physical layer channel occupied by the third signal and a physical layer channel occupied by the fourth signal are respectively two independent PUCCHs.

In one subsidiary embodiment of the subembodiment, a physical layer channel occupied by the third signal is a PUSCH, a physical layer channel occupied by the third signal is a PUCCH, and the PUSCH and the PUCCH are independent.

In one subsidiary embodiment of the subembodiment, a physical layer channel occupied by the third signal is a PUCCH, a physical layer channel occupied by the third signal is a PUSCH, and the PUCCH and the PUSCH are independent.

In one subsidiary embodiment of the subembodiment, a code rate adopted by the fourth signal is lower than a code rate adopted when the first bit block is transmitted in the second radio resource block.

In one subsidiary embodiment of the subembodiment, a Modulation and Coding Scheme (MCS) adopted by the fourth signal is lower than an MCS adopted when the first bit block is transmitted in the second radio resource block.

In one subsidiary embodiment of the subembodiment, the second bit block is used to generate L1 modulation symbol(s), and a number of REs occupied by the third radio resource block other than REs used for transmitting an RS is equal to L1.

In one subsidiary embodiment of the subembodiment, the second bit block is used to generate L2 modulation symbol(s), and a number of REs occupied by the third radio resource block other than a number of REs used to transmit an RS is equal to L1, L1 is less than L2, and the L2 modulation symbol(s) is(are) mapped onto the L1 RE(s) by means of puncturing.

In one example of the subsidiary embodiment, L2 is equal to a number of REs occupied by the second radio resource block other than a number of REs used to transmit an RS.

In one example of the subsidiary embodiment, one of the L2 modulation symbol(s) mapped onto a multicarrier symbol occupied by the first radio resource block is punctured.

In one embodiment, a start multicarrier symbol occupied by the first radio resource block is a first multicarrier symbol, and an end multicarrier symbol occupied by the first radio resource block is a second multicarrier symbol; a start multicarrier symbol occupied by the second radio resource block is a third multicarrier symbol, and an end multicarrier symbol occupied by the second radio resource block is a fourth multicarrier symbol; the first multicarrier symbol and the third multicarrier symbol belong to a first sub-slot, and the second multicarrier symbol and the fourth multicarrier symbol belong to a second sub-slot.

In one subembodiment of the embodiment, the first sub-slot and the second sub-slot are two contiguous sub-slots in time domain, and the first sub-slot is located before the second sub-slot.

In one subembodiment of the embodiment, the first sub-slot and the second sub-slot are a same sub-slot.

In one subembodiment of the embodiment, the first sub-slot and the second sub-slot respectively belong to two contiguous slots in time domain.

In one embodiment, the first signaling is Downlink Control Information (DCI).

In one embodiment, the second signaling is DCI.

In one embodiment, the first signaling is used to schedule the first signal.

In one embodiment, the second signaling is used to schedule the second signal.

In one embodiment, the first signaling is a physical-layer signaling.

In one embodiment, the second signaling is a physical-layer signaling.

In one embodiment, the first signaling carries an MCS of the first signal.

In one embodiment, the first signaling carries of DeModulation Reference Signals (DMRS) configuration information of the first signal.

In one embodiment, the DMRS configuration information comprises one or more of a port, occupied time-domain resources, occupied frequency-domain resources, occupied code-domain resources, an RS sequence, a mapping mode, a DMRS type, a cyclic shift, or an Orthogonal Cover Code (OCC) of the DMRS.

In one embodiment, the first signaling carries a New Data Indicator (NDI) corresponding to the first signal.

In one embodiment, the first signaling carries a Redundancy Version (RV) corresponding to the first signal.

In one embodiment, the first signaling is used to indicate the first radio resource block.

In one embodiment, the first signaling is used to indicate time-domain resources occupied by the first signal.

In one embodiment, the first signaling is used to indicate frequency-domain resources occupied by the first signal.

In one embodiment, the first signaling carries a HARQ process number adopted by the first signal.

In one embodiment, the second signaling carries an MCS of the first signal.

In one embodiment, the second signaling carries DMRS configuration information of the first signal.

In one embodiment, the DMRS configuration information comprises one or more of a port, occupied time-domain resources, occupied frequency-domain resources, occupied code-domain resources, an RS sequence, a mapping mode, a DMRS type, a cyclic shift, or an OCC of the DMRS.

In one embodiment, the second signaling carries an NDI corresponding to the second signal.

In one embodiment, the second signaling carries an RV corresponding to the second signal.

In one embodiment, the second signaling is used to indicate the second air-interface-resource block.

In one embodiment, the second signaling is used to indicate time-domain resources occupied by the second signal.

In one embodiment, the second signaling is used to indicate frequency-domain resources occupied by the second signal.

In one embodiment, the second signaling carries a HARQ process number adopted by the second signal.

In one embodiment, the first signaling and the second signaling respectively carry two different HARQ process numbers, and a bit block carried by the first signal and a bit block carried by the second signal respectively adopt two different HARQ process numbers.

In one embodiment, the first signaling is a DL Grant.

In one embodiment, the second signaling is a DL Grant.

In one embodiment, the first signaling is Sidelink Control Information (SCI).

In one embodiment, the second signaling is SCI.

In one embodiment, a physical layer channel bearing the first signal comprises a Physical Sidelink Shared Channel (PSSCH).

In one embodiment, a physical layer channel bearing the second signal comprises a PSSCH.

In one embodiment, a physical layer channel bearing the first bit block comprises a PSSCH.

In one embodiment, a physical layer channel bearing the second bit block comprises a PSSCH.

In one embodiment, the first bit block carries a HARQ-ACK on sidelink.

In one embodiment, the second bit block carries a HARQ-ACK on sidelink.

Embodiment 6

Figure 6:
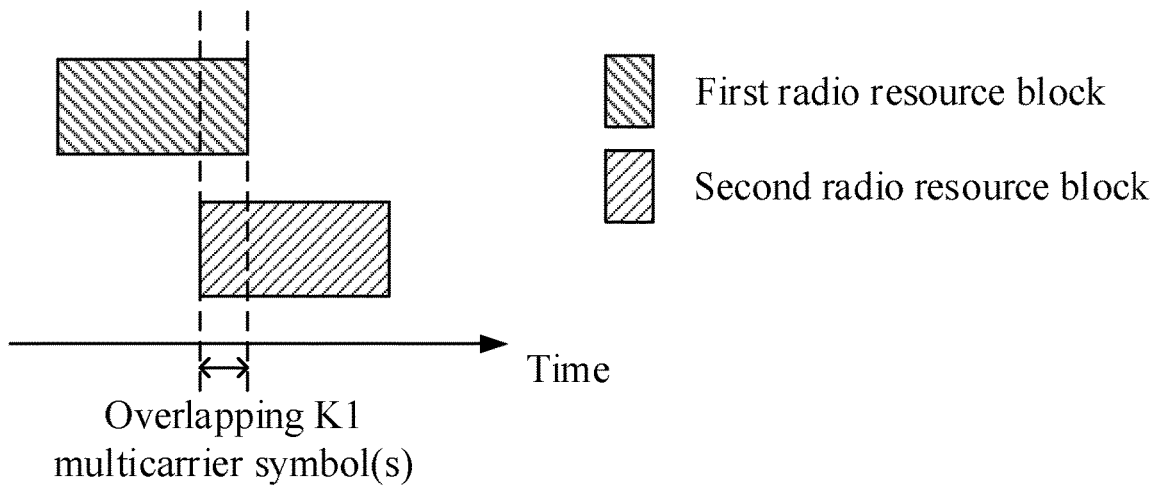
FIG. 6 illustrates a schematic diagram of a first radio resource block and a second radio resource block according to one embodiment of the present disclosure.

Embodiment 6 illustrates a schematic diagram of a first radio resource block and a second radio resource block, as shown in FIG. 6. In FIG. 6, there exists a partial overlapping between the first radio resource block and the second radio resource block in time domain, and time-domain resources corresponding to the overlapping part comprise K1 multicarrier symbol(s); and the first radio resource block and the second radio resource block are not completely overlapped in time domain.

In one embodiment, the meaning of the above phrase of the first radio resource block and the second radio resource block being not completely overlapped in time domain includes: the first radio resource block occupies Q1 multicarrier symbols, and the second radio resource block occupies Q2 multicarrier symbols; there at least exists a multicarrier symbol in the Q1 multicarrier symbols not belonging to the Q2 multicarrier symbols, or there at least exists a multicarrier symbol in the Q2 multicarrier symbols not belonging to the Q1 multicarrier symbols.

In one embodiment, the meaning of the above phrase of the first radio resource block and the second radio resource block being not completely overlapped in time domain includes: there at least exists a multicarrier symbol belonging to the Q1 multicarrier symbols and not belonging to the Q2 multicarrier symbols, or there at least exists a multicarrier symbol belonging to the Q2 multicarrier symbols and not belonging to the Q1 multicarrier symbols.

In one embodiment, frequency-domain resources occupied by the first radio resource block and frequency-domain resources occupied by the second radio resource block are orthogonal in frequency domain.

Embodiment 7

Figure 7:
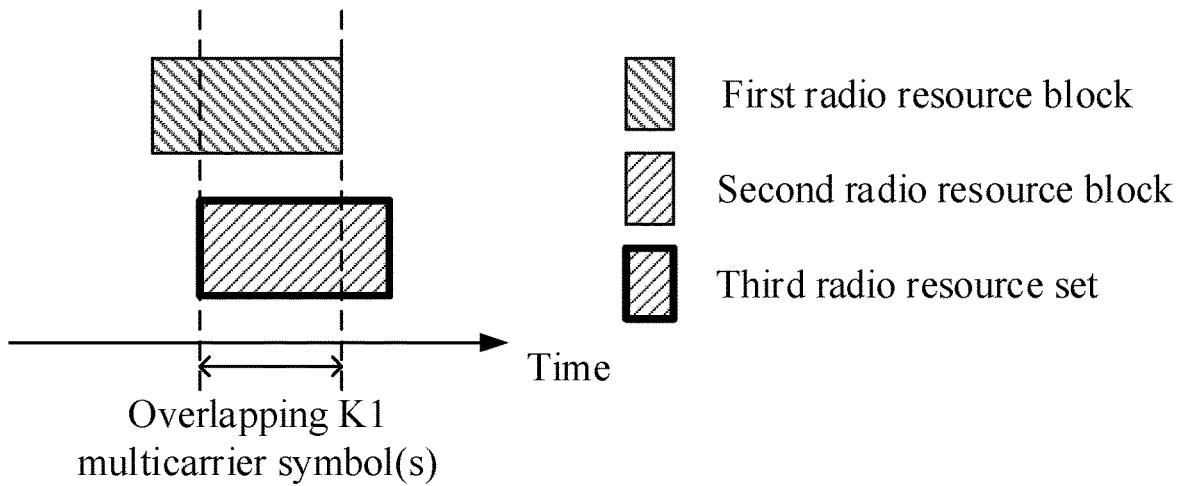
FIG. 7 illustrates a schematic diagram of a third radio resource set according to one embodiment of the present disclosure.

Embodiment 7 illustrates a schematic diagram of a third radio resource set, as shown in FIG. 7. In FIG. 7, the overlapping part of the first radio resource block and the second radio resource block in time domain comprises K1 multicarrier symbol(s), K1 is greater than a first integer, and the third radio resource set is the second radio resource block.

In one embodiment, the first integer is related to a number of multicarrier symbols occupied by a sub-slot.

In one embodiment, a number of multicarrier symbols occupied by the sub-slot in the present disclosure is equal to T, and the first integer changes linearly with T; T is a positive integer.

In one embodiment, a number of multicarrier symbols occupied by the sub-slot in the present disclosure is equal to T, the first integer increases with the increase of T, and the first integer decreases with the decrease of T; T is a positive integer.

Embodiment 8

Figure 8:
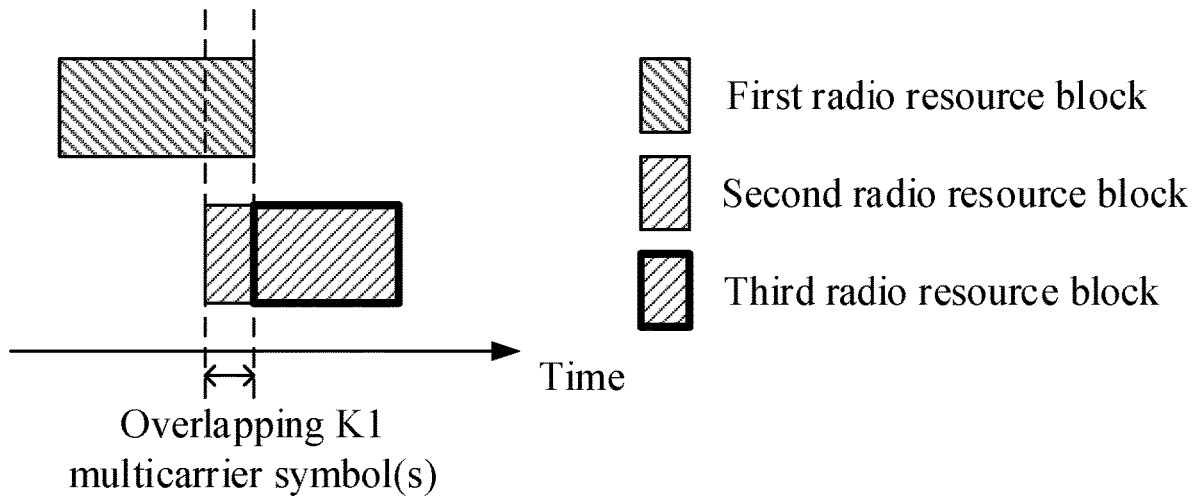
FIG. 8 illustrates a schematic diagram of a third radio resource set according to another embodiment of the present disclosure.

Embodiment 8 illustrates another schematic diagram of a third radio resource set, as shown in FIG. 8. In FIG. 8, an overlapping part of the first radio resource block and the second radio resource block in time domain comprises K1 multicarrier symbol(s), and when K1 is not greater than a first integer, the third radio resource set comprises the first radio resource block and a third radio resource block, time-domain resources occupied by the third radio resource block is a part of time-domain resources occupied by the second radio resource block being orthogonal to time-domain resources occupied by first radio resource block; the first bit block is transmitted in the first radio resource block, and the second bit block is transmitted in the third radio resource block.

In one embodiment, frequency-domain resources occupied by the first radio resource block and frequency-domain resources occupied by the second radio resource block are orthogonal.

In one subembodiment of the embodiment, the orthogonal refers to that there does not exist a same subcarrier simultaneously belonging to frequency-domain resources occupied by the first radio resource block and frequency-domain resources occupied by the second radio resource block.

In one embodiment, the first radio resource block and the second radio resource block occupy same frequency-domain resources.

Embodiment 9

Figure 9:
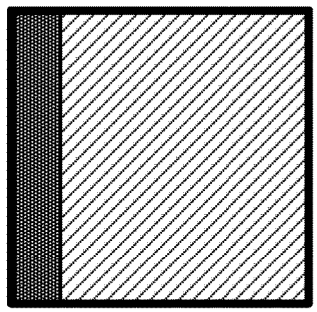
FIG. 9 illustrates a schematic diagram of a second bit block being mapped to a third radio resource block according to one embodiment of the present disclosure.
Figure 9:

Embodiment 9 illustrates a schematic diagram of a second bit block being mapped onto a third radio resource block, as shown in FIG. 9. In FIG. 9, a modulation symbol generated by the second bit block is mapped onto the third resource block by puncturing.

In one embodiment, the second bit block is used to generate L2 modulation symbol(s), and a number of REs occupied by the third radio resource block other than REs used for transmitting an RS is equal to L1, L1 is less than L2, and the L2 modulation symbol(s) is(are) mapped onto the L1 RE(s) by means of puncturing.

In one embodiment, L2 is equal to a number of REs occupied by the second radio resource block other than a number of REs used for transmitting an RS.

In one embodiment, one of the L2 modulation symbol(s) is mapped onto a multicarrier symbol occupied by the first radio resource block to be punctured.

Embodiment 10

Figure 10:
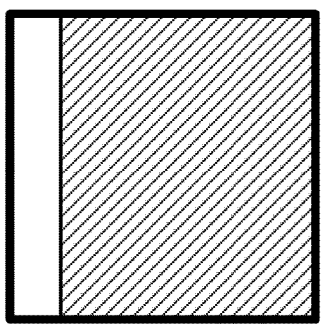
FIG. 10 illustrates a schematic diagram of a second bit block being mapped to a third radio resource block according to another embodiment of the present disclosure.
Figure 10:
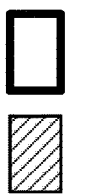

Embodiment 10 illustrates another schematic diagram of a second bit block being mapped to a third radio resource block, as shown in FIG. 10. In FIG. 10, the second bit block generates L1 modulation symbol(s) by rate matching, and a number of REs occupied by the third radio resource block other than REs used for transmitting an RS is equal to L1.

In one embodiment, a code rate adopted by a transmission of the second bit block in the third radio resource block is higher than a code rate adopted by a transmission of the second bit block in the second radio resource block.

In one embodiment, a modulation order adopted by a transmission of the second bit block in the third radio resource block is higher than a modulation order adopted by a transmission of the second bit block in the second radio resource block.

Embodiment 11

Figure 11:
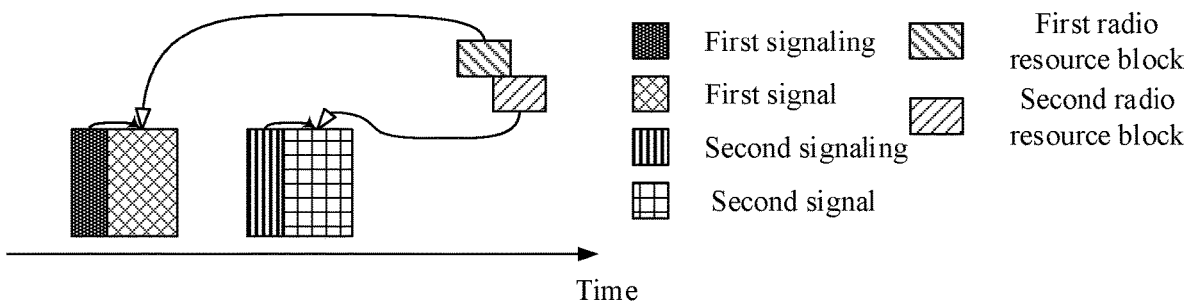
FIG. 11 illustrates a schematic diagram of a timing sequence relation according to one embodiment of the present disclosure.

Embodiment 11 illustrates a schematic diagram of a timing sequence relation, as shown in FIG. 11. In FIG. 11, the first node in the present disclosure receives a first signaling and a second signaling, the first signaling and a second signaling respectively schedule a first signal and a second signal, and a feedback for the first signal and a second signal is transmitted in a third radio resource set.

In one embodiment, the first signaling is used to determine time-domain resources occupied by the first radio resource block in the present disclosure.

In one embodiment, the second signaling is used to determine time-domain resources occupied by the second radio resource block in the present disclosure.

In one embodiment, the first signal and the second signal respectively correspond to different service types.

In one embodiment, the first signal and the second signal respectively correspond to different requirements of feedback delay.

In one embodiment, the first signal is a signal of an Enhanced Mobile Broadband (eMBB), and the second signal is a signal of URLLC.

Embodiment 12

Figure 12:
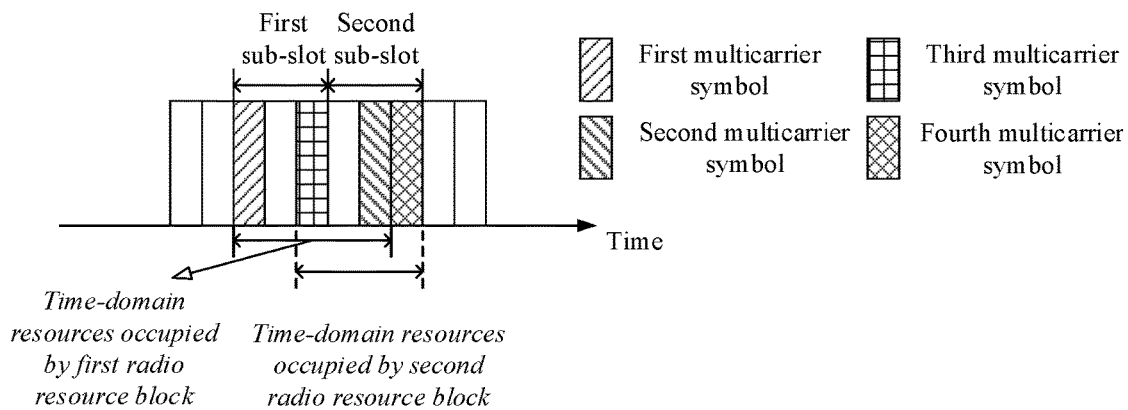
FIG. 12 illustrates a schematic diagram of a first multicarrier symbol and a second multicarrier symbol according to one embodiment of the present disclosure.

Embodiment 12 illustrates a schematic diagram of a first multicarrier symbol and a second multicarrier symbol, as shown in FIG. 12. In FIG. 12, a start multicarrier symbol occupied by the first radio resource block is a first multicarrier symbol, and an end multicarrier symbol occupied by the first radio resource block is a second multicarrier symbol; a start multicarrier symbol occupied by the second radio resource block is a third multicarrier symbol, and an end multicarrier symbol occupied by the second radio resource block is a fourth multicarrier symbol; the first multicarrier symbol and the third multicarrier symbol belong to a first sub-slot, and the second multicarrier symbol and the fourth multicarrier symbol belong to a second sub-slot; a rectangle in the figure corresponds to a multicarrier symbol.

In one embodiment, the first multicarrier symbol is a first one of multicarrier symbols occupied by the first radio resource block in time domain, and the second multicarrier symbol is a last one of multicarrier symbols occupied by the first radio resource block in time domain.

In one embodiment, the third multicarrier symbol is a first one of multicarrier symbols occupied by the second radio resource block in time domain, and the fourth multicarrier symbol is a last one of multicarrier symbols occupied by the second radio resource block in time domain.

In one embodiment, a multicarrier symbol occupied by the first sub-slot is not greater than 4.

In one embodiment, a multicarrier symbol occupied by the second sub-slot is not greater than 4.

Embodiment 13

Figure 13:
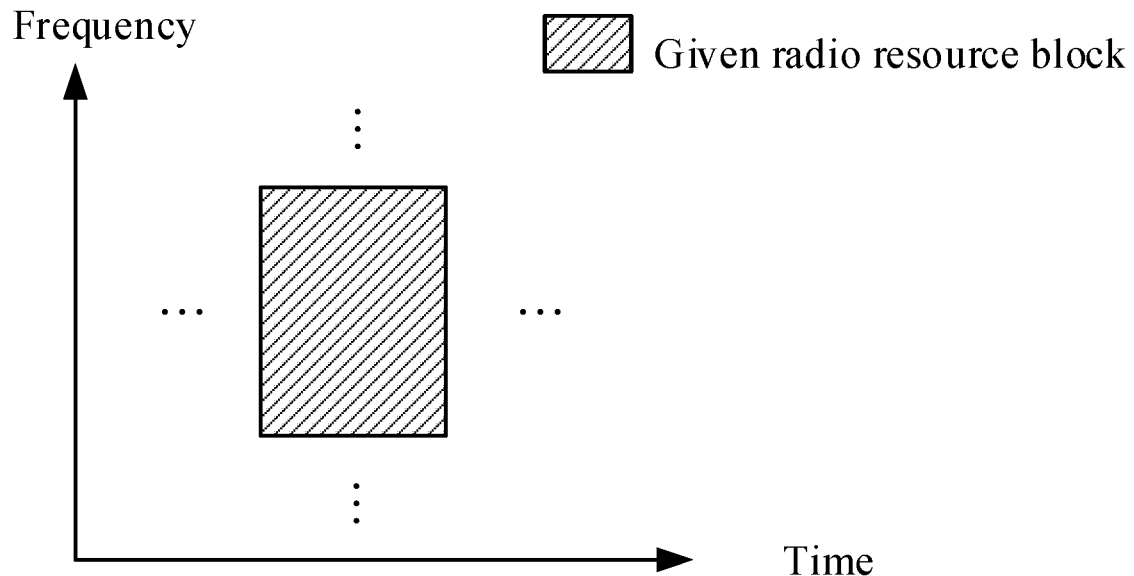
FIG. 13 illustrates a schematic diagram of a given radio resource block according to one embodiment of the present disclosure.

Embodiment 13 illustrates a schematic diagram of a given radio resource block, as shown in FIG. 13. In FIG. 13, the given radio resource block is the first radio resource block in the present disclosure, or the given radio resource block is the second radio resource block in the present disclosure, or the given radio resource block is the third radio resource block in the present disclosure.

In one embodiment, the given radio resource block comprises at least one RE in time-frequency domain, a said RE occupies a multicarrier symbol in time domain, and occupies a subcarrier in frequency domain.

In one embodiment, the given radio resource block comprises at least one multi-carrier symbol in time domain.

In one embodiment, the given radio resource block comprises at least one sub-carrier symbol in frequency domain.

In one embodiment, the given radio resource block comprises at least one RB in frequency domain.

In one embodiment, the given radio resource block comprises at least one sub-channel in frequency domain.

In one embodiment, the given radio resource block comprises at least one consecutive multi-carrier symbol in time domain.

In one embodiment, the given radio resource block comprises time-domain resources and frequency-domain resources.

In one embodiment, the given radio resource block comprises time-domain resources, frequency-domain resources and code-domain resources.

In one embodiment, code-domain resources in the present disclosure comprise one or more of pseudo-random sequences, low-PAPR sequences, a cyclic shift, an OCC, an orthogonal sequence, a frequency-domain orthogonal sequence and a time-domain orthogonal sequence.

In one embodiment, the given radio resource block is a PUCCH resource.

In one embodiment, the given radio resource block is a PUCCH resource set.

Embodiment 14

Figure 14:
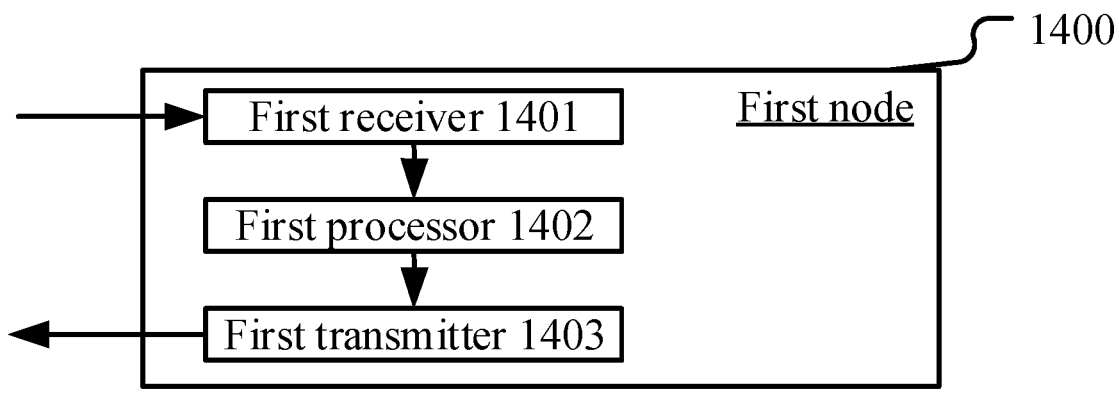
FIG. 14 illustrates a structure block diagram in a first node according to one embodiment of the present disclosure.

Embodiment 14 illustrates a structure block diagram in a first node, as shown in FIG. 14. In FIG. 14, a first node 1400 comprises a first receiver 1401, a first processor 1402 and a first transmitter 1403.

The first receiver 1401 receives a first signal and a second signal;

the first processor 1402 determines that there exists an overlapping part in time domain between time-domain resources occupied by a first radio resource block and time-domain resources occupied by a second radio resource block; and the first transmitter 1403 transmits a first bit block and a second bit block in a third radio resource set;

In embodiment 14, the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

In one embodiment, when K1 is greater than a first integer, the third radio resource set is the second radio resource block, and the first bit block and the second bit block are used together to generate a target signaling; the target signaling is transmitted in the third radio resource set.

In one embodiment, when K1 is not greater than a first integer, the third radio resource set comprises the first radio resource block and a third radio resource block, time-domain resources occupied by the third radio resource block is a part of time-domain resources occupied by the second radio resource block being orthogonal to time-domain resources occupied by first radio resource block; the first bit block is transmitted in the first radio resource block, and the second bit block is transmitted in the third radio resource block.

In one embodiment, a start multicarrier symbol occupied by the first radio resource block is a first multicarrier symbol, and an end multicarrier symbol occupied by the first radio resource block is a second multicarrier symbol; a start multicarrier symbol occupied by the second radio resource block is a third multicarrier symbol, and an end multicarrier symbol occupied by the second radio resource block is a fourth multicarrier symbol; the first multicarrier symbol and the third multicarrier symbol belong to a first sub-slot, and the second multicarrier symbol and the fourth multicarrier symbol belong to a second sub-slot.

In one embodiment, the first receiver 1401 receives a first signaling and a second signaling; the first signaling comprises configuration information of the first signal, and the second signaling comprises configuration information of the second signal.

In one embodiment, time-domain resources occupied by the first radio resource block are not aligned with a boundary of a sub-slot, or time-domain resources occupied by the second radio resource block are not aligned with a boundary of a sub-slot.

In one embodiment, the first receiver 1401 comprises at least first four of the antenna 452, the receiver 454, the multi-antenna receiving processor 458, the receiving processor 456 and the controller/processor 459 in embodiment 4.

In one embodiment, the first processor 1402 comprises at least one of the antenna 452, the receiver/transmitter 454, the multi-antenna receiving processor 458, the receiving processor 456, the multi-antenna transmitting processor 457, the transmitting processor 468 or the controller/processor 459 in embodiment 4.

In one embodiment, the first transmitter 1403 comprises at least the first four of the antenna 452, the transmitter 454, the multi-antenna transmitting processor 457, the transmitting processor 468 and the controller/processor 459 in embodiment 4.

Embodiment 15

Figure 15:
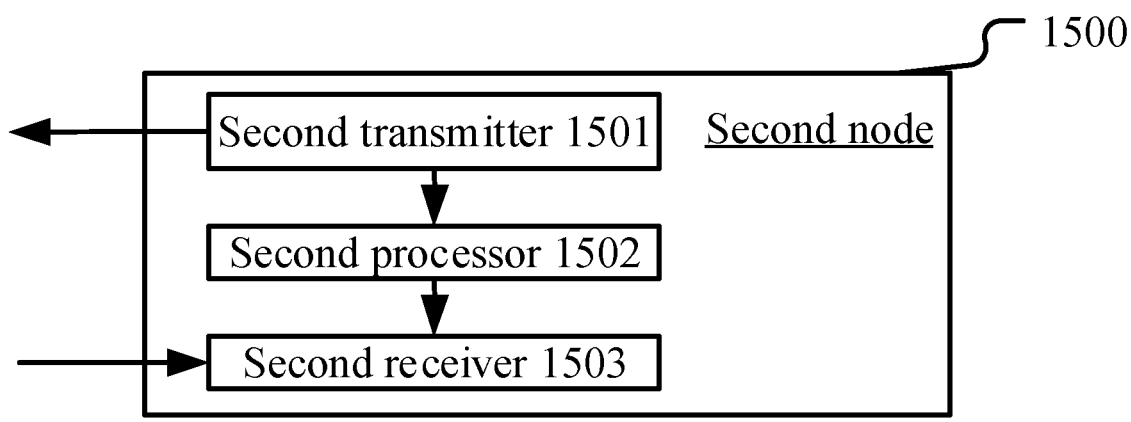
FIG. 15 illustrates a structure block diagram in a second node according to one embodiment of the present disclosure.

Embodiment 15 illustrates a structure block diagram of in a second node, as shown in FIG. 15. In FIG. 15, a second node 1500 comprises a second transmitter 1501, a second processor 1502 and a second receiver 1503.

the second transmitter 1501 transmits a first signal and a second signal;

the second processor 1502 determines that there exists an overlapping part in time domain between time-domain resources occupied by a first radio resource block and time-domain resources occupied by a second radio resource block; and the second receiver 1503 receives a first bit block and a second bit block in a third radio resource set;

In embodiment 15, the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in time domain comprises K1 multicarrier symbol(s), and time-domain resources occupied by the third radio resource set are related to K1; K1 is a positive integer.

In one embodiment, when K1 is greater than a first integer, the third radio resource set is the second radio resource block, and the first bit block and the second bit block are used together to generate a target signaling; the target signaling is transmitted in the third radio resource set.

In one embodiment, when K1 is not greater than a first integer, the third radio resource set comprises the first radio resource block and a third radio resource block, time-domain resources occupied by the third radio resource block is a part of time-domain resources occupied by the second radio resource block being orthogonal to time-domain resources occupied by first radio resource block; the first bit block is transmitted in the first radio resource block, and the second bit block is transmitted in the third radio resource block.

In one embodiment, a start multicarrier symbol occupied by the first radio resource block is a first multicarrier symbol, and an end multicarrier symbol occupied by the first radio resource block is a second multicarrier symbol; a start multicarrier symbol occupied by the second radio resource block is a third multicarrier symbol, and an end multicarrier symbol occupied by the second radio resource block is a fourth multicarrier symbol; the first multicarrier symbol and the third multicarrier symbol belong to a first sub-slot, and the second multicarrier symbol and the fourth multicarrier symbol belong to a second sub-slot.

In one embodiment, the second transmitter 1501 transmits a first signaling and a second signaling; the first signaling comprises configuration information of the first signal, and the second signaling comprises configuration information of the second signal.

In one embodiment, time-domain resources occupied by the first radio resource block are not aligned with a boundary of a sub-slot, or time-domain resources occupied by the second radio resource block are not aligned with a boundary of a sub-slot.

In one embodiment, the second transmitter 1501 comprises at least first four of the antenna 420, the transmitter 418, the multi-antenna transmitting processor 471, the transmitting processor 416 and the controller/processor 475 in embodiment 4.

In one embodiment, the second processor 1502 comprises at least one of the antenna 420, the transmitter/receiver 418, the multi-antenna transmitting processor 471, the multi-antenna receiving processor 472, the transmitting processor 416, the receiving processor 470 and controller/processor 475 in embodiment 4.

In one embodiment, the second receiver 1503 comprises at least the first four of the antenna 420, the receiver 418, the multi-antenna receiving processor 472, the receiving processor 470 and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node and the second node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The base station in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations, RSUs and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signal and a second signal;
a first processor, determining that there exists an overlapping part in a time domain between time-domain resources occupied by a first radio resource block and time-domain resources occupied by a second radio resource block; and
a first transmitter, transmitting a first bit block and a second bit block in a third radio resource set;
wherein the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in a time domain comprises K1 multicarrier symbol(s), and time-domain resources occupied by the third radio resource set are related to K1; K1 is a positive integer;
when K1 is greater than a first integer, the third radio resource set is the second radio resource block, and the first bit block and the second bit block are used together to generate a target signaling; the target signaling is transmitted in the third radio resource set;
when K1 is not greater than the first integer, the third radio resource set comprises the first radio resource block and a third radio resource block, time-domain resources occupied by the third radio resource block are a part of time-domain resources occupied by the second radio resource block being orthogonal to time-domain resources occupied by first radio resource block; the first bit block is transmitted in the first radio resource block, and the second bit block is transmitted in the third radio resource block; the first bit block generates a third signal, and the third bit block generates a fourth signal; an Resource Element (RE) occupied by the third signal and an RE occupied by the fourth signal are orthogonal;
a code rate adopted by the fourth signal is lower than a code rate adopted when the first bit block is transmitted in the second radio resource block; or
a Modulation and Coding Scheme (MCS) adopted by the fourth signal is lower than an MCS adopted when the first bit block is transmitted in the second radio resource block; or
the second bit block is used to generate L1 modulation symbol(s), and a number of REs occupied by the third radio resource block other than REs used for transmitting an RS is equal to L1; or the second bit block is used to generate L2 modulation symbol(s), and a number of REs occupied by the third radio resource block other than REs used for transmitting an RS is equal to L1, L1 is less than L2, and the L2 modulation symbol(s) is (are) mapped onto the L1 RE(s) by means of puncturing.

2. The first node according to claim 1, wherein the first integer is related to a type of a service corresponding to the first signal.

3. The first node according to claim 1, wherein the first integer is related to a type of a service corresponding to the second signal.

4. The first node according to claim 1, wherein information carried by the first bit block and information carried by the second bit block are used together to generate the target signaling; or, information carried by the first bit block and information carried by the second bit block are multiplexed in the target signaling.

5. The first node according to claim 1, wherein the third signal and the fourth signal are two pieces of independent Uplink Control Information (UCI).

6. The first node according to claim 1, wherein a start multicarrier symbol occupied by the first radio resource block is a first multicarrier symbol, and an end multicarrier symbol occupied by the first radio resource block is a second multicarrier symbol; a start multicarrier symbol occupied by the second radio resource block is a third multicarrier symbol, and an end multicarrier symbol occupied by the second radio resource block is a fourth multicarrier symbol; the first multicarrier symbol and the third multicarrier symbol belong to a first sub-slot, and the second multicarrier symbol and the fourth multicarrier symbol belong to a second sub-slot.

7. The first node according to claim 1, wherein the first receiver receives a first signaling and a second signaling; the first signaling comprises configuration information of the first signal, and the second signaling comprises configuration information of the second signal.

8. The first node according to claim 1, wherein time-domain resources occupied by the first radio resource block are not aligned with a boundary of a sub-slot, or time-domain resources occupied by the second radio resource block are not aligned with a boundary of a sub-slot.

9. The first node according to claim 1, wherein the first integer is related to a number of multicarrier symbols occupied by a sub-slot.

10. The first node according to claim 1, wherein the first signal and the second signal respectively correspond to different service types.

11. The first node according to claim 1, wherein the first signal is a signal of enhanced Mobile BroadBand (eMBB), and the second signal is a signal of Ultra Reliable and Low Lateney Communication (URLLC).

12. A second node for wireless communications, comprising:
a second transmitter, transmitting a first signal and a second signal;
a second processor, determining that there exists an overlapping part in a time domain between time-domain resources occupied by a first radio resource block and time-domain resources occupied by a second radio resource block; and
a second receiver, receiving a first bit block and a second bit block in a third radio resource set;

wherein the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in a time domain comprises K1 multicarrier symbol(s), and time-domain resources occupied by the third radio resource set are related to K1; K1 is a positive integer;

when K1 is greater than a first integer, the third radio resource set is the second radio resource block, and the first bit block and the second bit block are used together to generate a target signaling; the target signaling is transmitted in the third radio resource set;

when K1 is not greater than the first integer, the third radio resource set comprises the first radio resource block and a third radio resource block, time-domain resources occupied by the third radio resource block are a part of time-domain resources occupied by the second radio resource block being orthogonal to time-domain resources occupied by first radio resource block; the first bit block is transmitted in the first radio resource block, and the second bit block is transmitted in the third radio resource block; the first bit block generates a third signal, and the third bit block generates a fourth signal;

an Resource Element (RE) occupied by the third signal and an RE occupied by the fourth signal are orthogonal;

a code rate adopted by the fourth signal is lower than a code rate adopted when the first bit block is transmitted in the second radio resource block; or a Modulation and Coding Scheme (MCS) adopted by the fourth signal is lower than an MCS adopted when the first bit block is transmitted in the second radio resource block; or the second bit block is used to generate L1 modulation symbol(s), and a number of REs occupied by the third radio resource block other than REs used for transmitting an RS is equal to L1; or the second bit block is used to generate L2 modulation symbol(s), and a number of REs occupied by the third radio resource block other than REs used for transmitting an RS is equal to L1, L1 is less than L2, and the L2 modulation symbol(s) is (are) mapped onto the L1 RE(s) by means of puncturing.

13. A method in a first node for wireless communications, comprising:
receiving a first signal and a second signal;
determining that there exists an overlapping part in a time domain between time-domain resources occupied by a first radio resource block and time-domain resources occupied by a second radio resource block; and
transmitting a first bit block and a second bit block in a third radio resource set;
wherein the first bit block and the second bit block are respectively used to indicate whether a bit block carried by the first signal and a bit block carried by the second signal are correctly received; the first radio resource block and the second radio resource block are respectively reserved for transmitting the first bit block and the second bit block; the overlapping part of the first radio resource block and the second radio resource block in a time domain comprises K1 multicarrier symbol(s), and time-domain resources occupied by the third radio resource set are related to K1; K1 is a positive integer:

when K1 is greater than a first integer, the third radio resource set is the second radio resource block, and the first bit block and the second bit block are used together to generate a target signaling; the target signaling is transmitted in the third radio resource set;

when K1 is not greater than the first integer, the third radio resource set comprises the first radio resource block and a third radio resource block, time-domain resources occupied by the third radio resource block are a part of time-domain resources occupied by the second radio resource block being orthogonal to time-domain resources occupied by first radio resource block; the first bit block is transmitted in the first radio resource block, and the second bit block is transmitted in the third radio resource block; the first bit block generates a third signal, and the third bit block generates a fourth signal;

an Resource Element (RE) occupied by the third signal and an RE occupied by the fourth signal are orthogonal;

a code rate adopted by the fourth signal is lower than a code rate adopted when the first bit block is transmitted in the second radio resource block; or a Modulation and Coding Scheme (MCS) adopted by the fourth signal is lower than an MCS adopted when the first bit block is transmitted in the second radio resource block; or the second bit block is used to generate L1 modulation symbol(s), and a number of REs occupied by the third radio resource block other than REs used for transmitting an RS is equal to L1; or the second bit block is used to generate L2 modulation symbol(s), and a number of REs occupied by the third radio resource block other than REs used for transmitting an RS is equal to L1, L1 is less than L2, and the L2 modulation symbol(s) is (are) mapped onto the L1 RE(s) by means of puncturing.

* * * * *